Dec. 9, 1947.  R. R. BLAIR  2,432,084
ELECTRO-OPTICAL CONTROL SYSTEM
Filed Nov. 27, 1944

INVENTOR
R. R. BLAIR
BY
Stanley B. Kent
ATTORNEY

Patented Dec. 9, 1947

2,432,084

UNITED STATES PATENT OFFICE 2,432,084

ELECTROOPTICAL CONTROL SYSTEM

Royer R. Blair, Scotch Plains, N. J., assignor to Bell Telephone Laboratories, Incorporated, New York, N. Y., a corporation of New York Application November 27, 1944, Serial No. 565,336

10 Claims. (Cl. 250—41.5)

This invention relates to electro-optical control systems.

An object of the invention is to provide an improved electro-optical control system comprising a light sensitive electric device and a gaseous discharge trigger tube.

Another object is to provide an improved circuit employing a gaseous discharge trigger tube.

In an example of practice, a cold cathode gaseous discharge trigger tube is coupled to a photoelectric cell by means of condensers and resistors so that impulsive changes in the illumination of the photoelectric cell of desired characteristics will cause the trigger tube to fire after a predetermined delay. The amount of delay is dependent primarily upon the capacity values of the condensers and the resistance values of the resistors and is independent of the impedance values of the source of energy for the photoelectric cell and the trigger tube. This result is attained by transferring the charge of a first condenser to a second condenser through resistors of fixed resistance values to cause the trigger tube to fire. The charge on the first condenser is dependent on the static illumination of the photoelectric cell just before the impulsive change of illumination occurs. When the static illumination changes this charge is transferred to the second condenser by a transient flow of current. If the charge on the second condenser reaches a sufficiently high value, the trigger tube will be fired. In this example of practice the trigger tube is fired when the illumination is reduced from a value above some predetermined low value to substantially zero at a rate greater than some predetermined minimum rate and maintained at such reduced value for a period longer than some minimum period. To accomplish this result the main discharge gap of the trigger tube is connected in series with a load device across a battery of dry cells. An intermediate tap of this battery is connected through a first resistor of high resistance to the control anode of the trigger tube in order to place a positive bias on this control anode with respect to the cathode which bias is insufficient to fire the trigger tube. The photoelectric cell is connected in series with a second resistor of high resistance across the biasing portion of the battery, the cathode of the photoelectric cell being connected to the negative terminal of the battery. A first condenser is connected between the control anode of the trigger tube and the anode of the photoelectric cell which anode is also connected to the terminal of the second resistor remote from the battery. When the photoelectric cell is illuminated the first condenser is charged to the voltage of the voltage drop across the second resistor applied through the first resistor. A second condenser is connected across the first resistor to delay the production of a firing voltage across that first resistor when the illumination of the photoelectric cell is suddenly reduced to allow the first condenser to discharge through the second resistor and into the second condenser and through the first resistor. This discharge current is of a transient nature, during the early stages of which a firing charge is built up on the second condenser providing that the original charge on the first condenser is large enough and the charging voltage produced by the illumination of the photoelectric cell is reduced quickly enough and kept reduced a sufficient length of time. Increases of illumination, likewise, produce transient charges in the first condenser but the polarity of these charges is such as to oppose the biasing voltage so that the trigger tube cannot fire. According to this invention a control circuit is provided which is highly selective of the nature of the changes of the illumination which will effect firing of the trigger tube and in a specific embodiment produces delayed firing by means which is dependent solely on fixed resistors and condensers and is independent of the impedance of the battery. The main discharge current is also independent of the impedance of the battery since it is supplied from a third condenser which is charged from the battery through a third resistor of high resistance. This third condenser is connected in series with the load device across the main discharge gap of the trigger tube.

In a modified arrangement a plurality of load devices in series with individual condensers are connected across the main discharge gap. These condensers are charged in parallel from the battery and the main discharge current flows through and divides between the load devices simultaneously when the trigger tube is fired. This is an effective arrangement for energizing a plurality of load devices.

The invention will now be described more in detail having reference to the accompanying drawing.

The same reference characters are used to represent identical elements in the several figures of the drawing.

Figure 1:
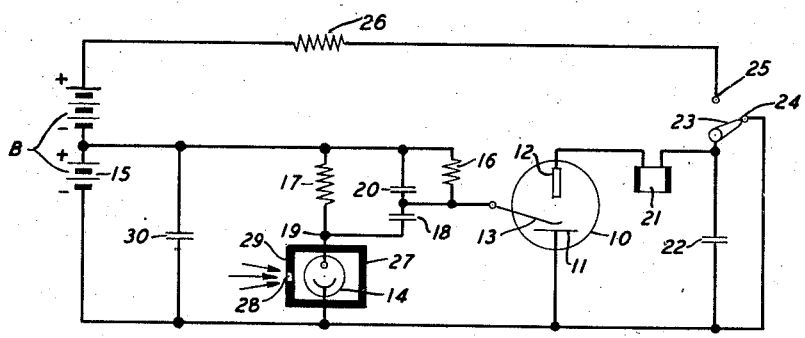
Fig. 1 shows one embodiment of the invention having a single load device.

Referring now to Fig. 1, a cold cathode gaseous discharge trigger tube 10 having a cathode 11, a main anode 12 and a control anode 13, is adapted to be fired by an impulsive reduction of the illumination of a photoelectric cell 14 in a desired manner. Electric current for both the trigger tube 10 and the photoelectric cell 14 is furnished by a dry battery B which includes a section 15 which furnishes a positive biasing potential for the control anode 13 with respect to the cathode 11 of trigger tube 10. The control anode 13 is connected through a resistor 16 to the positive terminal of section 15 of battery B. The photoelectric cell 14 in series with a resistor 17 is connected across section 15 of battery B with the cathode of the photoelectric cell 14 connected to the negative terminal of the battery. Photoelectric cell 14 is preferably a vacuum type of cell and the resistor 17 is so large that, except for relatively very small values of illumination, the current is relatively constant, most of the battery voltage being neutralized by the voltage drop across resistor 17. Therefore, there will be an appreciable reduction in current through resistor 17 only when the illumination is reduced from some relatively small value to a very low value or zero. A condenser 18 is connected between the control anode 13 of trigger tube 10 and the junction between the photoelectric cell 14 and the resistor 17 which condenser in any static condition of illumination of the photoelectric cell 14 is charged through resistor 16 to the voltage of the drop across resistor 17. A condenser 20 is connected across resistor 16 and is normally discharged through resistor 16, that is, when the illumination of photoelectric cell 14 is fixed or static. A load device 21 which may be any suitable utility such as for example a heater element, a light bulb or a current operable relay is connected in series with a condenser 22 across the main discharge gap of trigger tube 10 between the main anode 12 and the cathode 11. In the de-energized condition of this circuit condenser 22 is short-circuited by a contactor 23 of a two-position switch, when closed on contact 24, thus preventing any discharge through the main gap of trigger tube 10 and the load device 21. To energize the circuit, contactor 23 is closed on contact 25 of the switch, which contact 25 is connected through resistor 26 of high resistance to the positive terminal of battery B. Condenser 22 is slowly charged through resistor 26, this resistor having such a high resistance that the main discharge current through trigger tube 10 cannot be maintained by battery B even after the tube 10 has been fired.

The photoelectric cell 14 may be mounted in a light excluding container 27 which has a light transmitting portion or window 28 in one of its sides 29. The photoelectric cell 14 may be illuminated by light rays, represented by the arrows pointing toward the window 28, from a natural or artificial source. The illumination may be reduced by moving the circuit into a darkened location or by placing an opaque object in front of the window 28 of container 27.

If the section 15 of battery B has high impedance as it would, for example, if the battery were very cold or very old, it is desirable to connect a condenser 30 across the terminals of section 15, which condenser becomes charged. It is a characteristic of three-element cold cathode gaseous discharge tubes such as trigger tube 10, to require a certain minimum current in the control gap before a glow or arc will develop across the main gap, this minimum current being sometimes referred to as the transfer current. When trigger tube 10 fires by reason of a discharge between the cathode 11 and the control anode 13, condenser 30 discharges through condenser 20 and provides sufficient energy and a sufficiently low impedance path so that the required transfer current flows in the control gap until the discharge in the main gap has started.

The operation of the system of Fig. 1 will now be described. Even after the photoelectric cell 14 has been connected into the circuit, the main discharge cannot occur until the contactor 23 of the energizing switch has been moved from contact 24 to contact 25 and then only after condenser 22 has had time to charge through the high resistance of resistor 26. This period may be set at any value desired within limits. If the photoelectric cell 14 is kept dark, negligible current will flow through the cell and resistor 17 to drain section 15 of battery B. Furthermore, any transient charge produced in condenser 20 during an increase of current through resistor 17 caused by leakage current through photoelectric cell 14 if dark, or a photoelectric current if illuminated, when photoelectric cell 14 is connected into the circuit, is in a direction to prevent firing of the trigger tube 10. Only a reduction in the current flowing through resistor 17 produces a transient voltage across condenser 20 in the proper direction to fire trigger tube 10. Therefore trigger tube 10 can be fired only if contactor 23 has been closed on contact 25 for a sufficient length of time to allow condenser 22 to become charged and if illumination above a certain minimum value has been allowed to fall on photoelectric cell 14 for a period sufficient to charge condenser 18 to nearly the voltage of section 15 of the battery, and the illumination of photoelectric cell 14 is then reduced in a predetermined impulsive manner to a very low value.

Assume that the illumination is suddenly reduced to zero from some relatively static value above some relatively low value. When the illumination is present, condenser 18 is charged to the voltage of the drop across resistor 17 applied through resistor 16, condenser 20 being discharged during such static illumination. When the illumination is decreased suddenly to zero, current through photoelectric cell 14 practically disappears, and condenser 18 starts to discharge through resistors 17 and 16. However, at the very beginning of such discharge condenser 20 is itself discharged and acts as a short circuit for resistor 16 so that no voltage appears across resistor 16, all of the current being used to charge condenser 20. As the discharge of condenser 18 continues a voltage is gradually built up across condenser 20 which is dependent upon the relative capacities of condensers 18 and 20, the resistance of resistors 16 and 17 and the voltage drop across resistor 17 before and after the decrease of the illumination occurs. If the voltage built up across condenser 20 is sufficient when added to the biasing voltage of section 15 of battery B to fire the trigger tube 10 the trigger tube will fire and condenser 20 will discharge through the control gap of trigger tube 10. If the voltage built up across condenser 20 is not sufficient to fire the trigger tube 10, condensers 18 and 20 will both discharge, condenser 18 through both resistors 17 and 16 and condenser 20 through resistor 16. The rate of build-up of charge on condenser 20 is practically independent of the impedance of the battery B, thus improving the uniformity in delay of operation after the illumination is suddenly reduced. The fact that the photoelectric current is substantially constant for all values of illumination above some relatively low value due to the use of a vacuum type photoelectric cell and high value of resistance for resistor 17 makes the circuit inoperative for changes of illumination above such low value. Due to the delay in building up a charge on condenser 20, the circuit will not operate on rapid decreases of illumination if the decreased value of illumination is not maintained long enough. Due to the fact that the charge on condenser 20 is built up by the discharge of condenser 18, the circuit will not operate if the illumination is reduced too slowly, since the energy stored in condenser 18 will then be largely dissipated in resistance 16 without developing a large voltage across condenser 20. Due to the fact that the firing potential for trigger tube 10 is the sum of the biasing voltage of section 15 of battery B and the charge built up on condenser 20, the circuit will not operate unless the illumination is changed in a predetermined manner. In other words, the biasing potential alone cannot fire trigger tube 10. Furthermore, this circuit is relatively simple.

Figure 2:
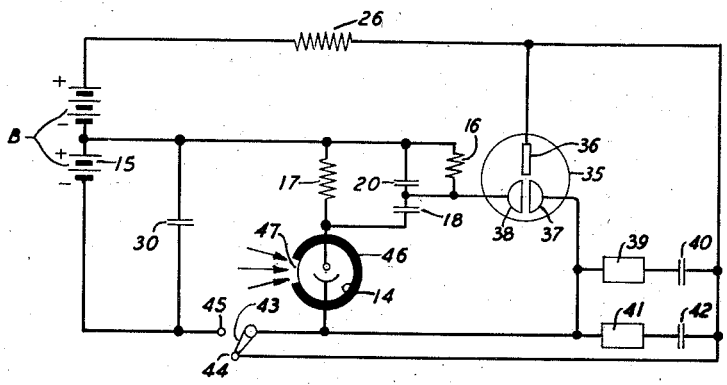
Fig. 2 illustrates a modified embodiment having a plurality of load devices.

Referring now to Fig. 2 a circuit much like that of Fig. 1 is shown. A trigger tube 35 is used which comprises a main anode 36 and two substantially identical electrodes 37 and 38. If either of these electrodes 37 and 38 is made sufficiently positive with respect to the other the discharge gap therebetween will break down and the tube will fire if the main discharge gap is energized. In the arrangement of Fig. 2 electrode 38 is positively biased and is adapted to be made more positive when the illumination of photoelectric cell 14 is suitably decreased. Electrode 38 therefore serves as the control anode and electrode 37 as the cathode. Furthermore, the main discharge current flows between the main anode 36 and the cathode 37, both because the voltage impressed thereon is higher than that impressed on electrode 38 and also because the impedance of the external circuit is considerably less. It is to be understood that the gaseous discharge tube 10 of Fig. 1 may be used instead of tube 35 in the circuit of Fig. 2. Two load devices 39 and 41 are adapted to be energized simultaneously when the trigger tube 35 fires. Load device 39 is adapted to be energized by the charge on condenser 40 and the load device 41 is adapted to be energized by the charge on condenser 42 when the contactor 43 of the energizing switch is moved from contact 44 in which position it closes discharge paths for condensers 40 and 42, to contact 45. Condensers 40 and 42 are charged slowly through resistor 26 by battery B when contactor 43 is closed on contact 45. Photoelectric cell 14 is provided with an opaque covering 46 over the outside surface of the cell container except for a window 47 through which light rays may enter to illuminate the cell. When the control gap of trigger tube 35 is fired by a suitable change of the illumination of photoelectric cell 14, condensers 40 and 42 discharge through the main discharge gap of trigger tube 35 and the respective load devices 39 and 41. The arrangement of Fig. 2 is not limited to the use of two load devices. More than two can be used. From the description hereinbefore given of the arrangement of Fig. 1, the nature of the arrangement of Fig. 2 and its method of operation will be apparent. It should be noted that this system of energizing multiple load devices involves increasing the total capacitance required to energize all of the load devices directly in proportion to the number of load devices, assuming that the load devices are of the same type, without increasing the voltage across the condensers. This arrangement is particularly advantageous if the load devices are of the type in which the circuit is opened when the load device is energized, such as for example detonators for explosive charges. If the plurality of detonators were connected in series, the capacitance would have to be increased in a much larger proportion to insure that the less sensitive or slower detonators in the series would be fired before the circuit was opened by the other faster or more sensitive detonators firing first.

Gaseous discharge tube 35 of Fig. 2 may be used instead of tube 10 in the circuit of Fig. 1, but the use of tube 10 is preferred.

In a specific application this invention may be used to delay an enemy force in the event that an army is required to retreat along a railroad which passes through a tunnel, for example. It may be advantageous to block the tunnel by wrecking a car loaded with explosives well within the tunnel after the retreating army has moved possibly several miles away from the tunnel mouth. In such a situation, a device such as that illustrated in Fig. 1 may be used to detonate the explosives on the car with suitable delay after the car, on which the explosives are loaded, has passed from the region of daylight outside the tunnel into the darkness of the tunnel. If the track is downgrade, the car can be allowed to coast into the tunnel by the action of gravity. In other circumstances, a locomotive can be used to push the car at considerable speed toward the tunnel and the car allowed to coast into the tunnel under its own momentum. In this proposed usage of the invention, a device such as that illustrated in Fig. 1 would be used to fire the detonator of the explosive charge with suitable delay when the car loaded with explosives passes into the tunnel. The load device 21 in this situation is the detonator of the explosive charge. While the device is being placed on the car, the control switch has the contactor 23 located on contact 24. The installation is completed by placing contactor 23 on contact 25. If the circuit is properly connected, the device will remain on the car during its trip to the tunnel unaffected by normal changes in the illumination of the photoelectric cell such as that produced by clouds or the passage of the car into and from railway cuts and even stations. It will be unaffected by the increasing light of dawn and the decreasing light of coming night or by any other normally changing natural light conditions. However, when the car passes into the substantial darkness of the tunnel, trigger tube 10 will be fired after a desired predetermined delay period.

Figure 3:
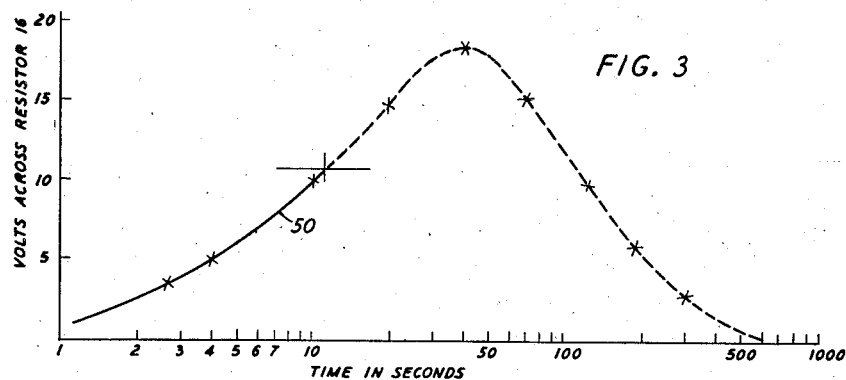
Fig. 3 is a graph illustrative of the operation of the invention.

In order to facilitate the practice of the invention suitable tubes and values for the circuit elements of Fig. 1 will be given for one embodiment of the invention. It is obvious that other values may be used depending upon the nature of the response desired. Typical tubes and values are as follows:

Photoelectric cell 14 _ G.E. 1P24 (two in parallel)
Trigger tube 10 _____ W. E. Co. No. 359A gas tube
Battery B (total) ____ 144 volts
Battery B (section 15) _____ 66 volts
Resistor 17 _____ 135 megohms
Resistor 16 _____ 180 megohms
Resistor 26 _____ 10 megohms
Condenser 18 _____ 0.25 microfarad
Condenser 20 _____ 0.25 microfarad
Condenser 22 _____ 1.0 microfarad
Condenser 30 _____ 0.0005 microfarad For the specific circuit values given just above there is shown in Fig. 3 the build-up of voltage on condenser 20 of Fig. 1 with time in seconds after the illumination is suddenly reduced to substantially zero from a value which produces a practical condition of saturation in the photoelectric cells. In the specific circuit under consideration a voltage of about 11 volts across condenser 20 will fire the trigger tube 10, the total voltage on the control anode then being 66 plus 11 or 77 volts. As seen from the solid portion of graph 50 of Fig. 3 approximately 11 seconds is required for such voltage to build up. The dotted portion of graph 50 shows how the voltage across condenser 20 would continue to build up and then decay if the control anode 13 were disconnected. In actual practice the discharge of condenser 20 commences as soon as the control gap breaks down. The dotted portion of curve 50 is of interest, however, in the understanding of this invention. It should be noted that the scale of ordinates in Fig. 3 is logarithmic. The voltage across condenser 20, before the sudden reduction of the illumination, that is, at zero time, is zero. Since zero time cannot be shown on a logarithmic scale, zero time is not shown in Fig. 3.

The term "light," as used herein, includes radiations having wave lengths both longer and shorter than those of visible light, such as infrared light and ultraviolet light, as well as those of visible light.

This invention may find embodiment in forms other than those described specifically hereinbefore. A thyratron may be used in place of the cold cathode gaseous trigger tube providing obvious changes are made in the circuit to take into account differences in tube characteristics. All such embodiments come within the purview of the appended claims.

What is claimed is:

1. An electro-optical control system comprising a gaseous discharge trigger tube having a cathode, a main anode and a control electrode, a photoelectric cell, a source of steady biasing potential connected to said cathode and control electrode to bias said control electrode with respect to said cathode to near the breakdown potential of said tube, and means including a capacity-resistance circuit connected between said cell and said cathode and control electrode of said trigger tube wherein a transient voltage is produced when the illumination of said cell is decreased to a small value at a rate between predetermined limits which transient voltage is added to said steady biasing voltage causing said tube to become conducting, said capacity-resistance circuit comprising a first condenser charged by a battery through said photoelectric cell and a second condenser charged solely by the charge in said first condenser when said illumination is reduced.

2. An electro-optical control system comprising a light sensitive electric device, a source of direct current, a first resistor connected in series with said light sensitive device across said source, a first and a second condenser connected in series across said first resistor, said first condenser being connected to the terminal of said first resistor which is connected to said light sensitive electric device, a second resistor connected across said second condenser, a gaseous discharge trigger tube having a cold cathode, a main anode and a control anode, said control anode being connected to the common connection of said first and said second condensers and said cathode being connected to the negative terminal of said source, and a load device connected in series with the main discharge gap between the cathode and main anode of said trigger tube.

3. An electro-optical control system comprising a light sensitive electric device, a source of direct current, a first resistor connected in series with said light sensitive electric device across said source, said first resistor being connected to the positive terminal of said source and said light sensitive electric device being connected to the negative terminal of said source, a first and a second condenser connected in series across said first resistor, said first condenser being connected to the terminal of said resistor which is connected to said light sensitive electric device, a second resistor connected across said second condenser, a gaseous discharge trigger tube having a cold cathode, a main anode and a control anode, said control anode being connected to the common connection of said first and second condensers and said cathode being connected to the negative terminal of said source, and a load device connected in series with the main discharge gap between the cathode and main anode of said trigger tube.

4. An electro-optical control system comprising a light sensitive electric device, a source of direct current, a first resistor connected in series with said light sensitive electric device across a portion of said source, a first and a second condenser connected in series across said first resistor, said first condenser being connected to the terminal of said resistor which is connected to said light sensitive electric device, a second resistor connected across said second condenser, a gaseous discharge trigger tube having a cold cathode, a main anode and a control anode, said control anode being connected to the common connection of said first and said second condensers and said cathode being connected to the negative terminal of said source, a load device connected in series with the main discharge gap between the cathode and main anode of said trigger tube, and means to connect said last-mentioned series circuit across the terminals of said source.

5. An electro-optical control system comprising a photoelectric cell of the vacuum type, a source of direct current, a first resistor connected in series with said photoelectric cell across a low voltage portion of said source, the resistance of said first resistor being so high and the voltage of said portion of said source being so low that except for very little values of the illumination of said photoelectric cell the photoelectric current through said cell and first resistor is practically constant, a first and a second condenser connected in series across said first resistor, said first condenser being connected to the terminal of said resistor which is connected to said photoelectric cell, a second resistor connected across said second condenser, a gaseous discharge trigger tube having a cold cathode, a main anode and a control anode, said control anode being connected to the common connection of said first and second condensers and said cathode being connected to the negative terminal of said source, a load device, a series circuit including said load circuit and the main discharge gap between the cathode and main anode of said trigger tube, and means adapted to supply current to said last-mentioned series circuit when said tube fires.

6. An electro-optical control system comprising a light sensitive electric device, a source of direct current, a first resistor connected in series with said light sensitive device across said source, a first and a second condenser connected in series across said first resistor, said first condenser being connected to the terminal of said first resistor which is connected to said light sensitive electric device, a second resistor connected across said second condenser, a gaseous discharge trigger tube having a cold cathode, a main anode and a control anode, a load device connected in series with a third condenser between said cathode and main anode, and connections including a third resistor for charging said third condenser sufficiently to furnish the energizing current for said load device when the trigger tube fires.

7. An electro-optical control system comprising a light sensitive electric device, a source of direct current, a first resistor connected in series with said light sensitive device across said source, a first and a second condenser connected in series across said first resistor, said first condenser being connected to the terminal of said first resistor which is connected to said light sensitive electric device, a second resistor connected across said second condenser, a gaseous discharge trigger tube having a cold cathode, a main anode and a control anode, a plurality of load devices connected in series with condensers individual thereto, said plurality of series circuits being connected in parallel between said cathode and main anode of said trigger tube, and means to charge said condensers sufficiently to furnish the energizing current for the respective load devices when the trigger tube fires.

8. An electrical control circuit comprising a gaseous discharge trigger tube having a cathode, an anode and a control electrode, a plurality of load devices connected in series with condensers individual thereto, said plurality of series circuits being connected in parallel between said cathode and anode of said trigger tube, means to charge said condensers sufficiently to furnish the energizing current for the respective load devices when the trigger tube fires, and means to fire said trigger tube.

9. A gaseous discharge trigger tube having a cold cathode, a main anode and a control anode, a source of direct current, a load device and a condenser connected in series, said series circuit being connected between the main anode and cathode of said trigger tube, a two-position switch adapted in one position to short-circuit said condenser and in the other position to connect the junction between said load device and said first condenser through a high resistance resistor to the positive terminal of said source, and means including a photoelectric cell connected between a tap on said source and said control anode for controlling the firing of said trigger tube in accordance with a desired changing of the illumination of said photoelectric cell.

10. An electro-optical system comprising a photoelectric cell of the vacuum type, a source of current, a resistor connected in a series circuit with said photoelectric cell and said source, the resistance of said resistor being so high that the photoelectric current flowing in said cell and resistor is practically constant for all illumination values of said cell above a desired relatively low value, a gaseous discharge trigger tube having a cathode, an anode and a control electrode, a condenser-resistance coupling between said series circuit and the control electrode and cathode of said trigger tube, and a load circuit operable by discharge current between the cathode and main anode of said trigger tube when said tube is fired by an impulsive change in the illumination of said photoelectric cell from a value above said relatively low value to a very low value.

ROYER R. BLAIR.

REFERENCES CITED

The following references are of record in the file of this patent:

UNITED STATES PATENTS

| Number | Name | Date |
|---|---|---|
| 1,774,457 | Singleton | Aug. 26, 1930 |
| 1,988,274 | Glaser | Jan. 15, 1935 |
| 2,155,224 | Geffcken | Apr. 18, 1939 |

OTHER REFERENCES

"Electrical World," Aug. 22, 1931, p. 342.